United States Patent [19]

Robin et al.

[11] Patent Number: 4,814,769

[45] Date of Patent: Mar. 21, 1989

[54] FRIEND-FOE INTERROGATION METHOD AND A SYSTEM USING THIS METHOD

[75] Inventors: Léon Robin, Massy; Dominique Roger, Paris, both of France

[73] Assignee: Thomson - CSF, France

[21] Appl. No.: 805,743

[22] Filed: Dec. 6, 1985

[30] Foreign Application Priority Data

Dec. 14, 1984 [FR] France ................. 84 19197

[51] Int. Cl.$^4$ ................. G01S 9/56; H04L 9/00
[52] U.S. Cl. ................. 342/45; 380/23
[58] Field of Search ................. 343/6.5 R; 340/825.54, 340/825.34, 825.44; 178/22.08; 370/10; 342/45; 371/37; 380/23, 25

[56] References Cited

U.S. PATENT DOCUMENTS

| | | |
|---|---|---|
| 4,194,201 | 3/1980 | Stein ................. 342/45 |
| 4,322,729 | 3/1982 | Honold et al. ................. 343/6.5 R |
| 4,364,049 | 12/1982 | Moore et al. ................. 343/6.5 R |
| 4,384,288 | 5/1983 | Walton ................. 340/825.34 |
| 4,427,980 | 1/1984 | Fennell et al. ................. 340/825.44 |
| 4,584,720 | 4/1986 | Garrett ................. 370/10 |

Primary Examiner—Salvatore Cangialosi

[57] ABSTRACT

For carrying out an interrogation a position modulated laser light wave is used. A key word is displayed in an interrogator and coded in accordance with a cyclic code, for example Golay's code. This coded key word is used for modulating the laser wave. In the responder the same key word is displayed and coded in the same way. After reception and demodulation each message is compared in a correlation circuit with the local reference word. The correlation method used allows parasite pulses to be taken into account and the word received to be validated with a given security threshold.

13 Claims, 5 Drawing Sheets

FIG_1

FIG_2

FIG_3

FIG_5-a

FIG_5-b

FIG_6-a

FIG_6-b

FIG_6-c

FIG_6-d

FIG_6-e

FIG_6-f

FRIEND-FOE INTERROGATION METHOD AND A SYSTEM USING THIS METHOD

BACKGROUND OF THE INVENTION

1. Field of the Invention

The invention relates to friend-foe interrogation for establishing radio communication links or for identifying an external system, generally a vehicle or an aircraft. The modulation of a light wave such as the laser ray is preferably used, which confers on the link a high degree of discretion and protection against jamming.

2. Description of the Prior Art

It is known to use light wave modulation for transmitting digital information or for establishing friend-foe links called IFF (identification of friend and foe).

The complete IFF link require an interrogator and a responder and is established by means of a key word. Generally, in the interrogator a laser generator is used for producing a first light wave. This wave may be modulated either in frequency or in amplitude. Frequency modulation takes place on each side of a mean value F, amplitude modulation is effected by the presence or absence of pulses. For this, a laser emitting modulator receives from a control and coding circuit a modulation signal translating the code or the key word to be transmitted. At the level of the responder, the same control and coding circuit is used for coding a monitoring key word. A laser receiver and a demodulator deliver to a correlation circuit the key word received for comparing it with the key word of the responder. Depending on this comparison, the key word is validated or not. The result of this comparison is communicated to the interrogator, for example by radio, for establishing the final communication.

Amplitude modulation has always been the most widely used, for it is easy to put into practice. But it has two major disadvantages. The first is the ambiguity of decision, resulting for example from high fluctuations of the amplitude. An insufficient pulse amplitude may be mistaken for a zero. The second disadvantage is the low information capacity of the corresponding messages. This point is particularly important in an IFF link where the duration of the message must be short. Frequency modulation consists in transmitting two or more recurrence frequencies characterizing a coding structure. But for a laser of a wave length equal to 1.06 microns, the number of recurrences is limited. The capacity of the message remains therefore small.

Furthermore, for some applications, the safety measures imposed are such that these transmission techniques and the coding means used do not provide a sufficient degree of discretion.

The aim of the invention is to provide a connection system which allows the use of a large number of different key words and in which the coding system appreciably reduces the risks of interception and decoding of the key word.

A first feature of the invention consists in using position modulation called MP, or PPM (pulse position modulation).

A second feature consists in employing a method of coding using a cyclic code and decoding by correlation of the key word without fixed reference pulse.

It is also proposed for the responder, on the one hand, to take into account parasite pulses and, on the other, not to wait for the end of reception of the key word before decoding so as to reduce the interrogation time.

SUMMARY OF THE INVENTION

The invention provides a friend-foe interrogation method by modulation of a wave between an interrogator unit transmitting a code word by modulating said wave and a responder unit receiving the coded word transmitted and identifying it by correlation with a coded identification word identical to the transmitted coded word, wherein:
  modulation of the wave is position modulation,
  coding of the transmitted and identification words uses a cyclic code, identification of the dates of the modulation pulses takes place without fixed reference pulse.

The invention also provides a friend-foe interrogation system by modulation of a wave comprising on the one hand an interrogator unit comprising a transmitting part formed of a coding assembly elaborating a control signal characteristic of a key word to be transmitted, a generator elaborating a modulation signal from the coded signal and a transmitter controlled by the signal and transmitting the key word modulating said wave, and a receiver part, and on the other hand a responder unit comprising a coding assembly elaborating a reference signal identical to the coded signal, means for correlating and validating the word received with respect to the reference word, and a transmitting part for sending a response to the receiver part of the interrogator, wherein the modulation of said wave is position modulation, said coding assemblies are formed from a device displaying the key word having a given number of bits, means for transcoding this initial coded key word into a final key word having a different number of bits by means of a cyclic code, and a circuit for the transcription in time of said final key word into a given number of dates of the modulation pulses of the key word to be transmitted or of the reference key word.

BRIEF DESCRIPTION OF THE DRAWINGS

The features and advantages of the invention will be better understood from reading the following description given by way of example and illustrated by the accompanying Figures which show.

PREFERRED EMBODIMENTS OF THE INVENTION

In the description, the method of interrogation will be described concurrently with the system.

Figure 1:
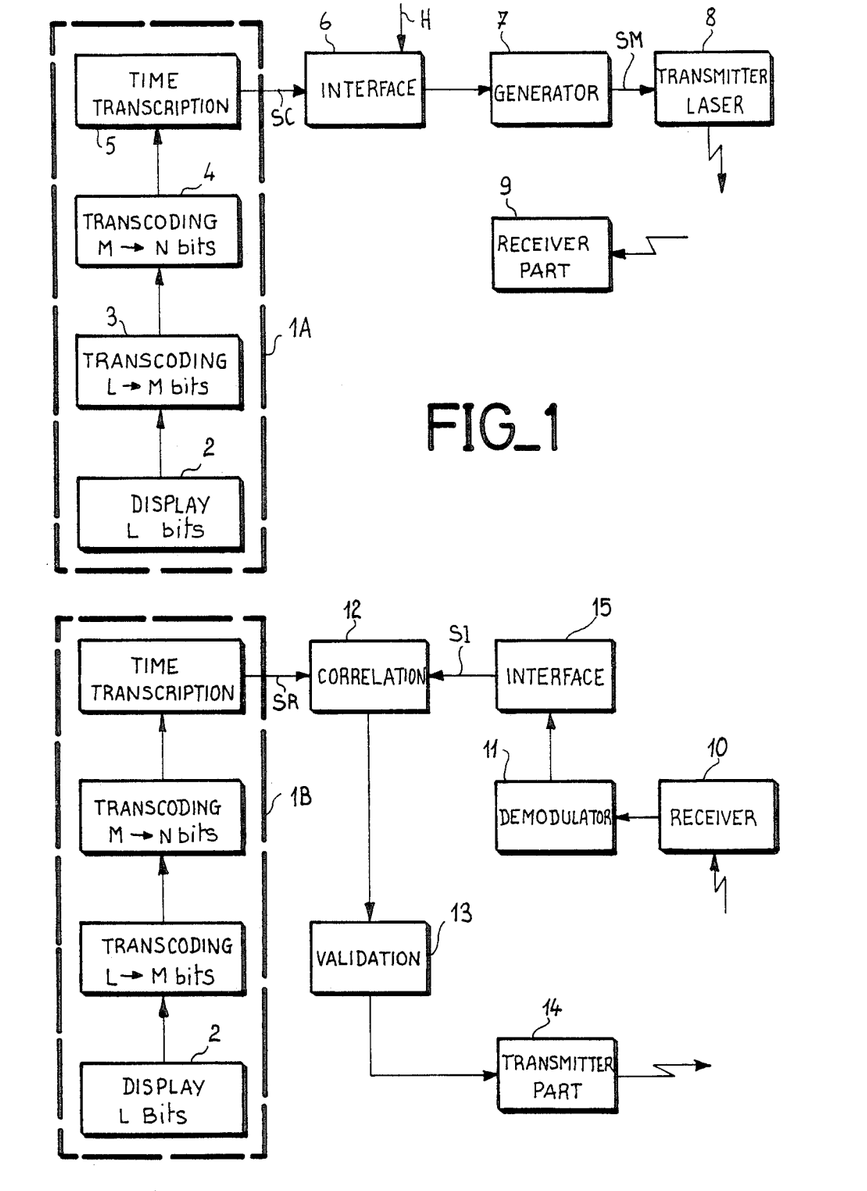
FIG. 1, a general diagram of the interrogator-responder unit of the system of the invention.

The friend-foe interrogation system comprises an interrogator unit and a responder unit (FIG. 1). The same coding assembly 1A or 1B is used both in the interrogator unit and in the responder unit. It serves, in the case of the responder, for controlling the transmission of a coded key word, and for the responder in coding the reference key word for comparing this latter with the different messages received, in this case a transmitted coded word.

The signal elaborated by the coding assembly 1A of the interrogator represents a coded key word and is called control signal SC. It is applied through an interface 6 to a generator 7 which elaborates a modulation signal SM from the signal SC and which controls a modulator-transmitter sub assembly 8. This latter, by modulating a light wave and more particularly a laser wave, transmits the coded word. A receiver part 9, which may be a radio receiver, may then be used for receiving a message of good transmission transmitted on behalf of the responder.

The signal elaborated by the coding assembly IB of the responder represents a local word and is called reference signal SR. It is applied to a correlation circuit 2. A receiver 10, compatible with the transmitter 8, receives the coded word. A demodulator 11 receives the output of receiver 10 and transmits the demodulated word received through an interface 15 to the correlation circuit 12. This latter comprises processing circuits which compare the reference signal SR with the output SI of the interface 15 which delivers the messages received and theoretically the key word transmitted by the interrogator. A validation circuit 13 receives the result of the correlation and depending on predetermined criteria determines whether the word received is to be validated or not. A transmitter part 14, for example a radio transmitter controlled by the validation, may be used for sending a response message to the interrogator and possibly for establishing the final communication between the two posts.

The principle of the transcoding assemblies 1A and 1B is the following: from a significant word represented octally by the key word, transcoding is effected so as to obtain a binary sequence having a high entropy so, for systems foreign to the communication, a high degree of uncertainty as to its detection. The code is chosen linear and cyclic, that is to say that an addition sequence of K bits is added to each word of a number M of bits, so that the final word transmitted comprises a different number N of bits such that N=M+K, so as to obtain a sufficient redundancy.

A display device 2 allows the operator to display the key word of an initial number L of bits, and to code this word in binary numeration. The display may be provided by coding wheels defining an octal word. Transcoding means 3 and 4, receiving the output of the display device, transform this initial word of L bits into a final word of N bits which allows the control signal SC to be formed. These transcoding means are divided into two transcoding circuits. A first transcoding circuit 3, called random, transforms the word to be coded of L bits into a word of M bits. The purpose of this circuit is to make the word coherent with the code used. A second, so called linear, transcoding circuit 4, effects the coding properly speaking of the word of M bits into a word of N bits in accordance with the code used. This circuit uses a cyclic linear code for the data transmission. Golay's code is preferably used which transcribes a word of 12 bits (M) into a word of 23 bits (N) and a detailed explanation of which may be found in the work by Peterson and Weldon "ERROR CORRECTING CODES". A twenty fourth bit is added so as to simplify the correspondence between the position coding, described further on, and the binary code.

A feature of the invention being the use of position modulation by discrete positions, a time transcription circuit 5 is used which receives the word of 24 bits and calculates the D dates ($T_1$ to $T_D$) established with respect to the date $T_0$ of the first pulse. It delivers the control signal SC which is digital and which represents these dates.

In the interrogator, the control interface circuit 6, for example a programmable counter, receives a clock signal H and the control signal SC from the time transcription circuit 5 translating the D characteristic dates of the coded key word.

It transforms this control signal SC into a modulation signal SM.

Figure 2:
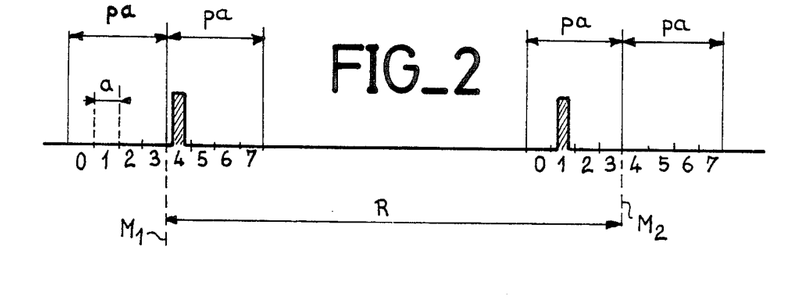
FIG. 2, a position modulation signal portion.

Referring to FIG. 2, the principle of this position modulation is as follows. The position of each pulse is located at each recurrence with respect to a mean position ($M_1$, $M_2$). This location takes place within 2.P intervals situated on each side of the mean position. Each of the intervals is coded, so that 2.P symbols can be caused to correspond therewith for each recurrence. It is therefore possible to code each position, by assigning to it either one of the 2.P symbols of the corresponding binary number. For example, if P=4, the number of symbols is 2.P=8 respectively noted 1, 2 . . . 8, and the binary equivalent may be expressed with 3 bits ($2^3$). The optimum binary coding assumes that P is a power of 2.

Figure 3:
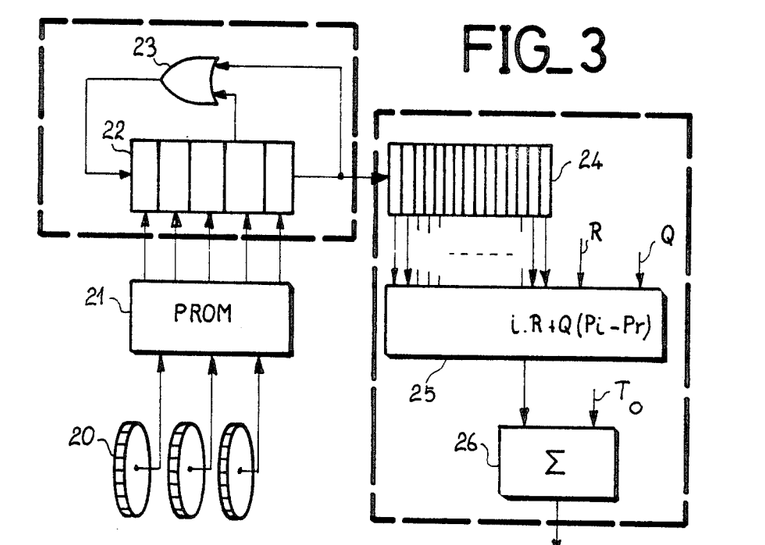
FIG. 3, one embodiment of the transcoding assembly of the system of the invention.

In FIG. 3, Q, represents the quantum, i.e. the time interval separating the different possible modulation positions from each other. If each position is located by 2.P symbols and if the useful message occupies D pulses, the coding capacity, i.e. the length of the message, is equal to (2.P)D or $B^D$ bits, B being such that $2.P=2^B$. The coding capacity is therefore $2^{B.D}$ and we have equality: $(2.P)^D=2^{B.D}$.

The main positions are separated from each other by a recurrence interval R. The constraints imposed on the IFF message are mainly the low value of the acquisition time and the reliability of the link. This latter is increased if an error correcting or detecting code is used, whose use is relatively easy, so as to reduce the computing volume and time. The choice of code, in this case Golay's code, is therefore a compromise between a structure of sufficient length for using the largest number of different key words, and the shortest possible acquisition time. On the other hand, in order to simplify the description, the number of modulation positions is 8, the number of useful pulses D per coded word is 4, plus a reference pulse.

The construction of the coding assembly shown in FIG. 3 is one example. It illustrates the different operations carried out in this system. An embodiment with a microprocessor may be contemplated for carrying out the different computations.

The display device is formed by three coding wheels 20 having 8 positions each. This gives the possibility of displaying $8^3=512$ combinations, namely 512 possible coded key words. The random transcoding circuit is a programmable read only memory 21 which causes a word of M=12 bits, to which the chosen code may be applied, to correspond to each key word L=9 bits ($2^9=512$). The linear transcoding circuit 4 effects a calculation which is tantamount to multiplying the 12 bit word by a twelve line and twenty four column matrix characteristic of the code so as to obtain a word of N=24 bits. This calculation may be made by a first shift register 22, operating in a first period, with parallel inputs coming from the ROM 21 and a series output, which supplies the first 12 bits of the code.

In a second period, by relooping a certain number of parallel outputs through an exclusive OR network 23 to the series input, the output of the register supplies the twelve following bits.

The time transcription circuit 5 effects the calculation of each of the dates $T_1$ to $T_D$, with respect to the reference pulse $T_o$, which has for expression:

$$T_i = i.R + Q(P_i = P_r)$$

where i is the number of recurrence or of the pulse (1 to D=4), R is the value of the recurrence interval, Q the quantum, $P_i$ the symbol of the modulation position i and $P_r$ the symbol of the reference position. The values R and Q are fixed beforehand as a function of the code, of the technology used and of the wave length of the laser. It may use a second shift register 24 receiving in series the output of the first register 22. It delivers in parallel the 24 bits which are taken into account three by three by a computing circuit 25 which calculates $T_i$. An adder 26 is then used for adding the value $T_O$.

Figure 4:
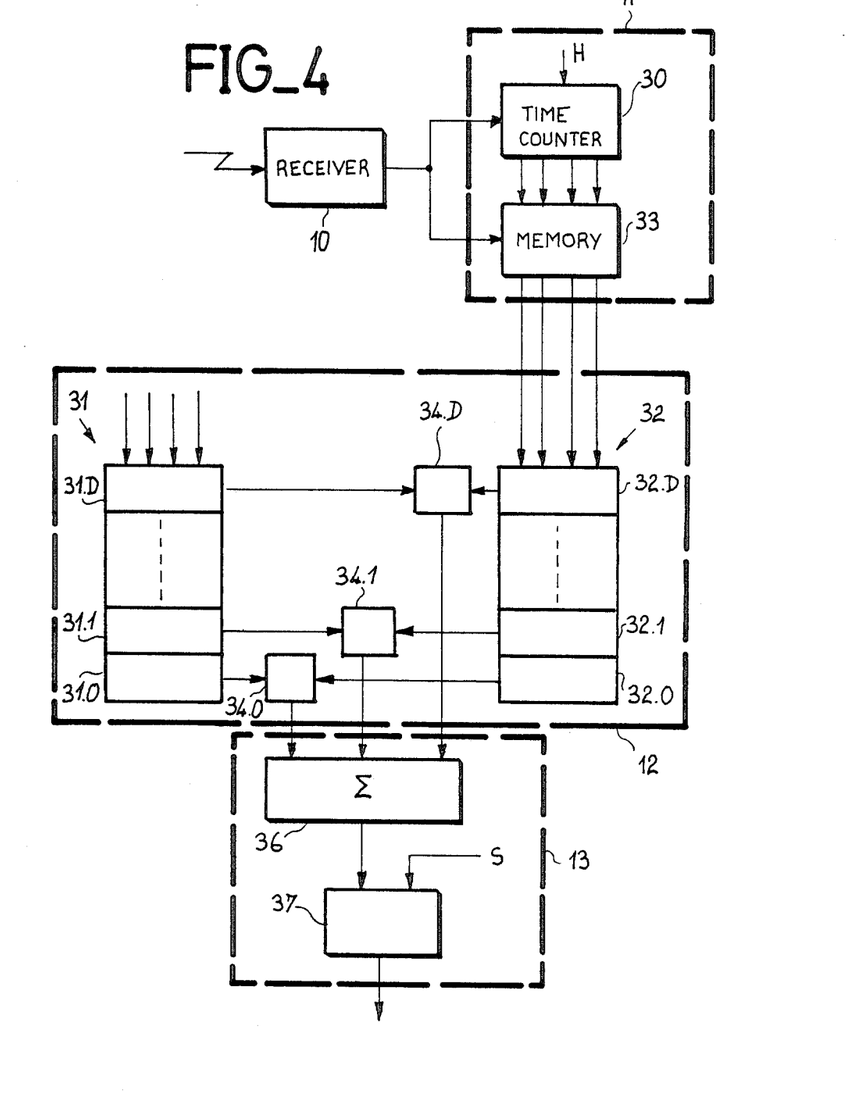
FIG. 4, one embodiment of the reception, correlation and validation circuits of the responder of the system.

With reference to FIG. 4 concerning the responder, the demodulator 11 may comprise a cyclic time counter 30 driven by a clock signal H identical to the one used in the interrogator. This counter is initiated by the first pulse received and coming from the laser receiver 10. Its output is connected to a memory 33 whose output is also controlled by the receiver. Thus, the output of memory 33 supplies the dates $T'_1$, $T'_2$, ... $T'_D$ of the pulses detected by the receiver, and this with respect to the date of the first pulse $T_0$.

The correlation circuit 12 proceeds digitally. It receives, in the form of dates, on the one hand the coded reference key word delivered through the transcoding assembly 1 of the responder and, on the other hand, the word detected through the interface 15. The local displayed word, theoretically identical to the one received, arrives in the form of dates $T_0, T_1, \ldots T_D$. These dates are stored in a first memory array 31. This array may be formed by several shift registers, one for each bit, representing the dates. The first memory 31.0 is formed by the first cell in each of the registers and contains the first date $T_0$. The second memory 31.1, contains the second date $T_1$, the last memory 31.D contains the last date $T_D$. The D dates $T'_0, T'_1, \ldots T'_D$ of the word received are stored in a similar manner to the dates of the local word, in a second memory array 32 which may be formed by several shift registers. The dates $T'_0, T'_1, \ldots T'_D$ are stored respectively in memories 32.0, 32.1 ... 32.D similar to memories 31.0 to 31.D.

A number D+1 of comparators, equal to the number of dates, 34.0, 34.1, ... 34.D, is used for comparing the contents of the memory arrays 31 and 32. The first comparator 34.0 compares the contents of the first two memories 31.0 and 32.0, the second 34.1 those of the second memories 31.1 and 32.1 and so on, the last 34.D those of the last memories 31.D and 32.D. Thus each date $T_o, T_1, \ldots, T_D$ characterizing the displayed word is compared with that $T'_0, T'_1, \ldots T'_D$ of the same order of the received pulses.

When the contents of two compared memories are identical, or considered as identical, the output of the comparator delivers a signal equal to 1, if they differ the signal is equal to 0;

The validation circuit 13 receives the output of each comparator 34.0 to 34.D in an adder circuit 36. The output of this adder is connected to the input of a threshold comparator 37. If strict identity is desired between the displayed word and the received word the threshold is fixed equal to the number D of dates of the displayed word. By displaying a threshold S of D−1 an error is tolerated concerning the transmission of the encoded word. Thus the received word may be validated with a probability compatible with performances required of the system. The output of this threshold comparator 37 forms the output of the validation circuit 13 and allows the transmitter 14 to be controlled.

On the responder level, the invention provides an improvement of the correlation procedure for limiting the time of recognition of the received word and for palliating a possible instability of the clock, not only in the interrogator but also in the responder.

Figure 5A:
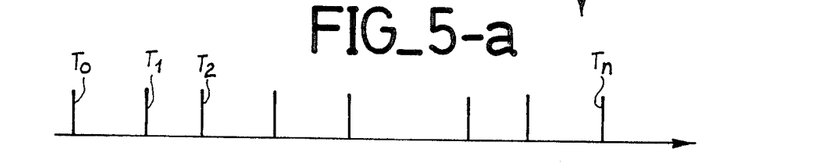
FIGS. 5a and 5b forms of signals relative to a first method of correlation of the responder of the system.
Figure 5B:
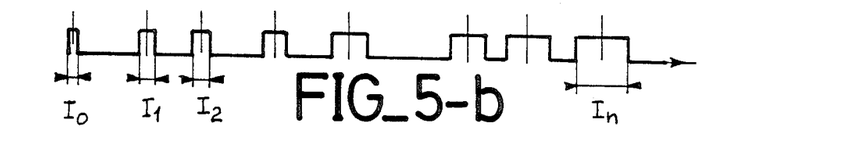

For the different dates $T_O$ to $T_D$ there are substituted time intervals $I_O$ to $I_D$ centered about corresponding dates, with $T_i = [T_i − E_i, T_i + E_i]$. Thus a slight difference can be tolerated between the display date $T_i$ and the corresponding received date $T'_i$. The intervals which the transcoding assembly 1B of the responder delivers and which characterize the coded reference word may be schematized by a rectangular signal, shown in FIG. 5b, and whose peak width is related to the stability of the clock. FIG. 5a shows the schematization of the corresponding data with respect to the intervals of FIG. 5b.

The D intervals I form a table of four lines and two columns, characterized by the number which is that of the reference pulse. A feature of the improvement of the procedure proposed consists in taking randomly any one of the dates $T_O$ to $T_D$ transmitted as reference pulse. A number D+1 of similar tables is formed in each of which are entered the intervals corresponding to each pulse. The time reference pulse is different for each table. It characterizes the table $M_j$ by its order number j in the sequence formed by the displayed local word, and each of the other pulses is dated with respect thereto, assuming that the local word has been repeated once. Each table contains therefore the minimum and maximum arrival times of the pulses to be received. The table $M_j$ contains the intervals $I_{1j}, I_{2j}, \ldots I_{Dj}, I_{ij}$ being the interval $[T_{ij} − E_i, T_{ij} + E_i]$ and $T_{ij} = i.R + Q (P_{i+j})$ (modulo D−$P_j$).

For example, with the local word represented by the four dates $T_1, T_2, T_3, T_4$, the table $M_2$ contains the intervals $I_{12}, I_{22}, I_{32}, I_{42}$, corresponding relatively to the dates $T_1, T_2, T_3, T_4$. The word has been repeated once, the dates being shifted on average four times the mean recurrence interval R.

Figure 6A:
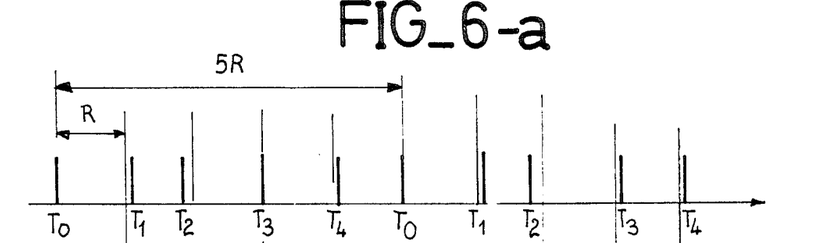
FIGS. 6a to 6e, forms of signals relative to a second method of correlating the responder of the system.
Figure 6B:
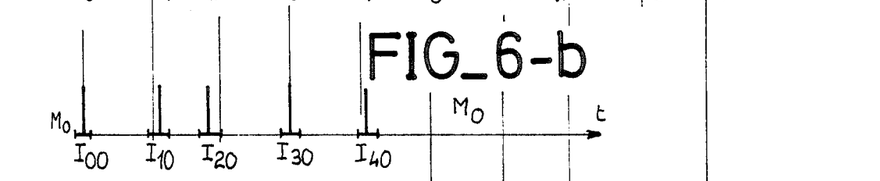
Figure 6C:
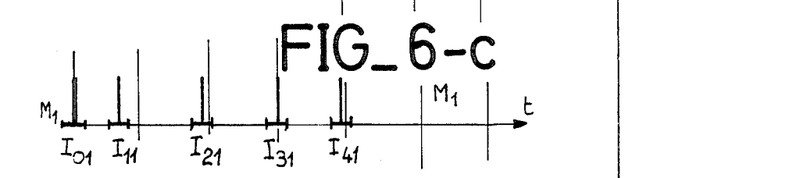
Figure 6D:
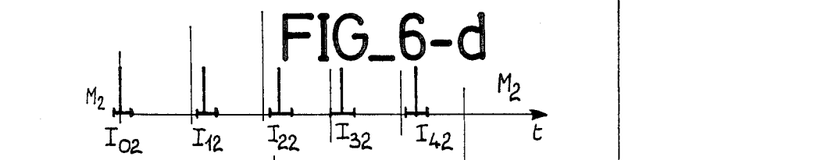
Figure 6E:
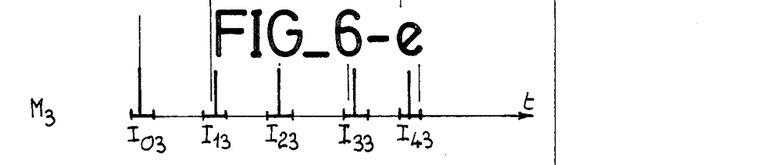
Figure 6F:
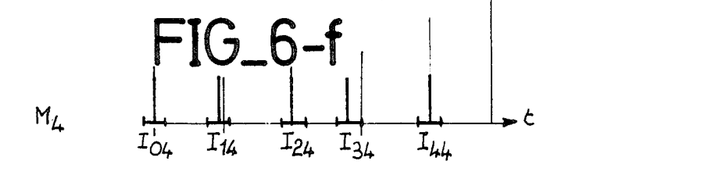

In FIG. 6b, the intervals are positioned with respect to the corresponding pulses, the first date $T_o$ being the reference. They form the intervals of the table $M_o$. In FIG. 6c, 6d, 6e, 6f are shown respectively the intervals of tables $M_1, M_2, M_3, M_4$ always positioned with respect to the corresponding dates. With the word repeated at least once, if the key word is received by the responder unit only from pulse $T_j$, this latter may be taken as reference for dating the following ones. The sequence of the first dates received corresponds to one of the tables.

Parasite pulses may be mixed, at reception, with pulses forming the word received. The correlation method of the invention allows this drawback to be overcome in the following way. This possibility only requires memories and a little additional software.

From the first pulse received modulo R dating of all the received pulses is effected. Each pulse is then characterized by its recurrence number j and by the symbol $P_i$ of its relative modulation position i with respect to the time corresponding to the mean recurrence. The relative dating is between $-R/2$ and $+R/2$. Thus a certain number of groups of datings is obtained normally equal to the number D of useful pulses received. A group may contain a number X of pulses comprising $X-1$ parasite pulses. The first pulse is then taken as time origin and the comparison of a sequence of time values is effected, each of them being taken from a different group. The prepositioned values of the comparison tables are used. After exhaustion of all the possible combinations, if there has not been validation, the second pulse received is then taken as time origin and the cycle begins again.

If, over two successive recurrence intervals, a negative result is obtained, i.e. if the sum of the output values of the comparator is equal to zero, testing on this sequence is discontinued and the following pulse is again taken. This procedure avoids superfluous operations and reduces the acquisition time.

Figure 7:
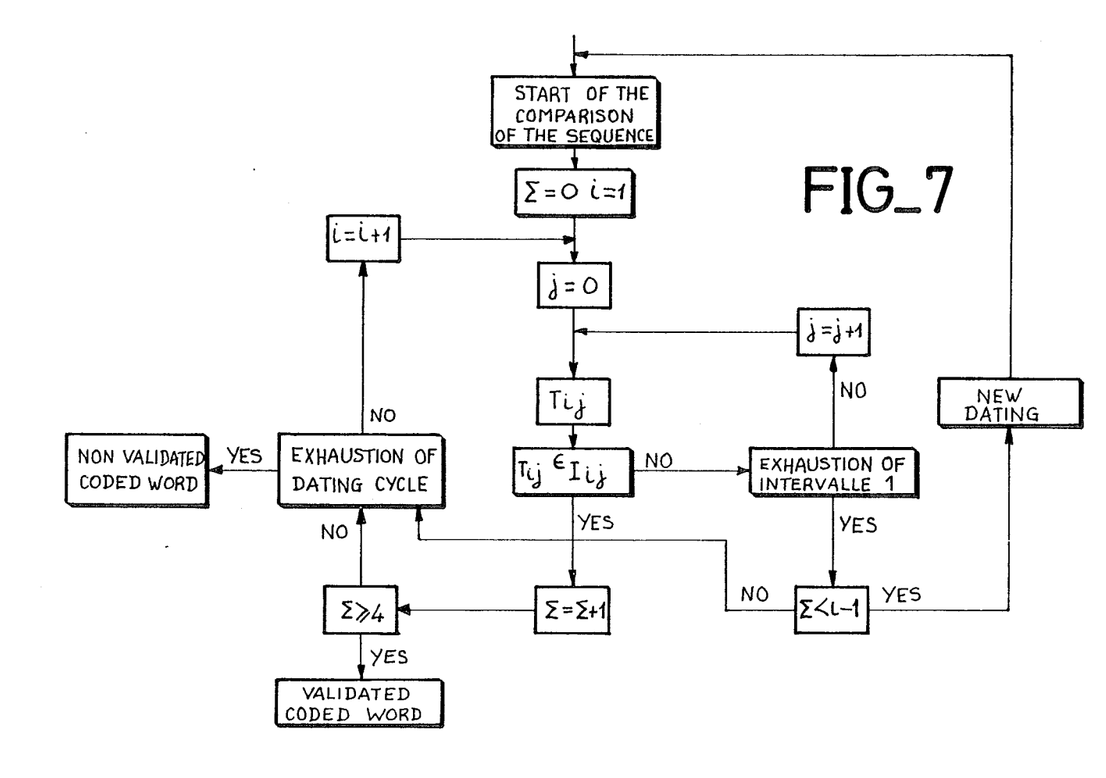
FIG. 7, a flow chart of a preferred progression of the correlation method used in the responder unit.

By way of example, and with reference to FIG. 7, the progress of the correlation is as follows. At the start of the comparison of the first sequence of dates the sum $\Sigma=0$; $i=1$; $j=0$ is fixed. The first date $T_{10}$ to be considered in the first sequence is compared with the interval $I_{10}$. If it belongs to this interval, the sum is incremented to $\Sigma=\Sigma+1$. Then i is incremented and the second date $T_{20}$ of the sequence is compared with its corresponding interval $I_{20}$. If the date $T_{10}$ does not belong to $I_{10}$, j is incremented.

When the intervals are exhausted and when the sum is less than $i-1$, the correlation begins again with a new sequence. This continues until the sum: $\Sigma=4$ (validated coded word), or, until exhaustion of the dating cycle of the sequences (non validated coded word).

The whole of the signal processing provided by the coding assemblies and the correlation and validation calculations in the responder may be effected by a microprocessor system.

What is claimed is:

1. A friend-foe interrogation method by modulation of wave between an interrogating unit transmitting a coded word by modulation of said wave and a responder unit receiving the coded word transmitted, the method including identifying the transmitted word by correlation with a coded identification word identical to the coded word transmitted, wherein
   modulation of the wave is discrete position modulation,
   coding of the transmitted and identification word uses a digital code, identification of the dates of the modulation pulses is provided without fixed reference pulse; and
   wherein said position modulation takes place for each modulation recurrence about a mean position and over a finite number of positions, identification for suppressing parasite pulses by correlation the following successive steps;
   assignment to each date of a reference word ($T_1$ to $T_D$) of an interval ($I_1$ to $I_D$) centered about the corresponding date;
   assignment to each data of the word received of a recurrence number and formation of a number D of groups of dates equal to the number of dates of the reference word;
   a first data received being taken as time reference comparison of all the possible sequences of dates received, a single data being taken from each group, with the sequence of the reference word, each sequence comparison being stopped when two successive date comparisons give a result equal to zero during validation;
   reiteration of the preceding step, each of the dates of the word received being taken successively as time reference, until a sequence is validated.

2. The method as claimed in claim 1, wherein, with said position modulation taking place for each modulation recurrence about a mean position and over a finite number of positions, identification by correlation comprises the three following steps:
   assignment to each data of the identification word ($T_1$ to $T_D$) of an interval ($I_1$ to $I_D$) centered about the corresponding date;
   comparison of each data of the word received ($T'_1$ to $T'_D$) with the corresponding interval;
   validation or not of the whole of the comparisons.

3. The method as claimed in any one of the preceding claims, wherein the wave used is supplied by a laser source.

4. The method as claimed in any one of the preceding claims, wherein the digital coding of the transmitted word and of the identification word is a cyclic code.

5. A friend-foe interrogation system employing discrete position modulation of a wave between an interrogating unit transmitting a coded word by modulation of said wave and a responder unit receiving the coded word transmitted, the system identifying the coded word by correlation with a coded identification word identical to the coded word transmitted, wherein coding of the transmitted and identification word uses a digital code, identification of the dates of the modulation pulses is provided without fixed reference pulse, the system including:
   an interrogator unit comprising an emitter part formed from a coding assembly establishing a control signal characteristic of a key word to be transmitted, a generator generating a modulation signal from a coded signal and a modulator-transmitter controlled by the modulation signal and transmitting the coded word modulating said wave, and a receiver part and
   a responder unit comprising coded assembly establishing a reference signal identical to the coded signal, means for correlating and validating a word received with respect to a reference word and a transmitter part for sending a response to the receiver part of the interrogator;
   said coding assemblies being formed of a device for displaying the key word having a given number of bits, means for transcoding an initial value of the key word into a final key word having a different number (N) of bits using a digital code;
   said transcoding means including a circuit for the time transcription of said final key word into a given number of dates ($T_O$ to $T_D$) of modulation pulses of the key word to be transmitted for forming a control signal, and for the time transcription of the reference key word for forming the reference signal.

6. The system as claimed in claim 5, wherein the wave used is supplied by a laser source.

7. The system as claimed in claim 5, wherein said coding assemblies each comprise a device for displaying the initial value of the key word, transcoding means receiving said initial word of (L) bits for transcoding it in accordance with said code into a final coded word of (N) bits transmitted to the time transcription circuit.

8. The system as claimed in claim 5, wherein said correlation means comprise two memory arrays for storing respectively the dates of the coded reference word and of the word received, and comparators for comparing the dates of the same rank two by two, validation means receiving the output of said comparators for validating or not the word received as a function of a given threshold.

9. The system as claimed in claim 8, wherein each comparator delivers a signal equal to 1, if the two dates compared are identical, equal to zero if the two dates compared are different, the validation circuit being formed of an adder receiving the output of each of said comparators and delivering the sum of the results to a threshold comparator which validates or not this sum as a function of a given threshold.

10. The system as claimed in claim 5, wherein said coding assemblies and said correlation and validation means are constructed in the form of a microprocessor system.

11. A system according to claim 5 wherein said word received at said responder unit forms a part of a received signal at said responder unit the received signal being received from said interrogator unit, the coded word introducing a cyclic code to the received signal with a pattern of a preset number of pulses transmitted repetitively from said interrogator unit, the cyclic code producing in said received signal a series of received code pulses which comprise a permutation of a sequence of the preset number of pulses; the system further comprising a correlation unit for correlating said received signal with said coded identification word, said received signal having a received sequence of said preset number of pulses, the coded identification word having a reference sequence of said preset number of pulses to validate a received sequence, said correlating including a comparison of said received sequence with permutations of said reference sequence; and wherein said correlation unit updates said received sequence with a next received pulse followed by a repetition of said correlating to attain validation of a received sequence, and the permutations enabling correlation without a fixed reference pulse.

12. A friend-foe interrogation method employing an interrogator and a responder comprising the steps of:
generating a signal to be transmitted by the interrogator, said step of generating including a step of modulating the signal with a repeating digital code word, the modulating being accomplished by discrete position modulation with dates of occurrence of modulation pulses being in accordance with digits of the code word;

transmitting the signals from the interrogator to the responder;

providing the responder with a copy of the digital code word; and at the responder, correlating the signal with the code word, said correlating including an identifying of dates of modulation pulses received at the responder, pulses being accomplished by use of only a portion of the modulation pulses by virtue of the repeating code word employed in the modulating; and wherein, in said signal generating step, said signal has an initial sequence of a preset number of pulses which repeat periodically in a series of pulses longer than said sequence of pulses; and said correlating step comprises a correlating of received sequences of said present number of pulses against a reference word having a reference sequence of said preset number of pulses to validate a received sequence, each of said received sequences being a permutation of said initial sequence, said correlating including a comparison of a received sequence with permutations of said reference sequence;

said method further including a step of updating said received sequence with a next received pulse followed by a repetition of said correlating step to attain validation of a received sequence, the updating of the sequence eliminating parasitic pulses from a validation of a received sequence, and the permutations of the received and the reference sequences enabling correlation without a fixed reference pulse.

13. A friend-foe interrogation method by modulation of a wave between an interrogating unit transmitting a coded word by modulation of said wave and a responder unit receiving the coded word transmitted and identifying it by correlation with a coded identification word identical to the coded word transmitted; wherein modulation of the wave is discrete position modulation;

coding of the transmitted and identification words uses a digital code, and identification of the data of the modulation pulses is provided without fixed reference pulse; the method further comprising steps of modulating said wave with a cyclic code in which a pattern of a preset number of pulses of a coded word repeat;

transmitting the wave to the responder unit to provide a signal to be received at the responder unit;

receiving said signal at aids responder unit to provide a received signal, the received signal having the form of a series of received code pulses and comprising a permutation of a sequence of the preset number of pulses;

at the responder unit, correlating the received signal against a reference signal comprising said coded identification word; and wherein said correlating step comprises a correlating of received sequences of preset number of pulses against a reference word having a reference sequence of said present number of pulses to validate a received sequence, said correlating including a comparison of a received sequence with permutations of said reference sequence;

said method including a step of obtaining said received sequence with a next received pulse followed by a repetition of said correlating step to attain validation of a received sequence, the updating of the sequence eliminating parasitic pulses from a validation of a received sequence, and the permutations of the received and the reference sequences enabling correlation of a fixed reference pulse.

* * * * *